W. E. SHARP.
METHOD OF FORMING BOLT NUTS.
APPLICATION FILED MAR. 5, 1914.
1,154,134.  Patented Sept. 21, 1915.
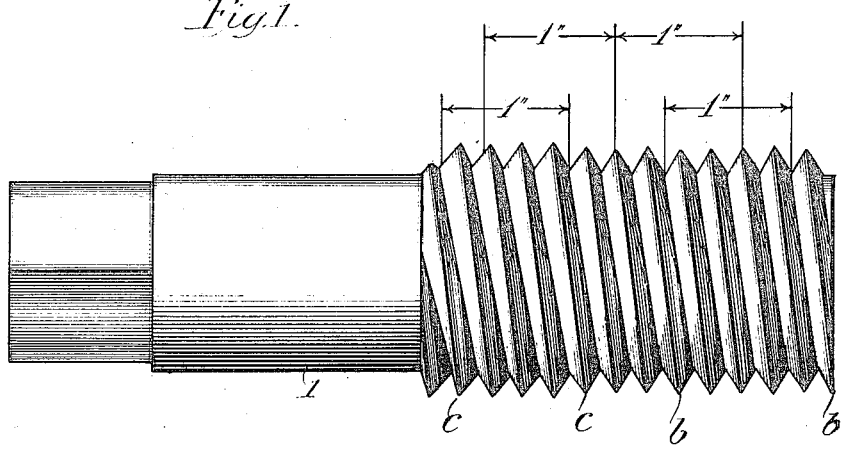
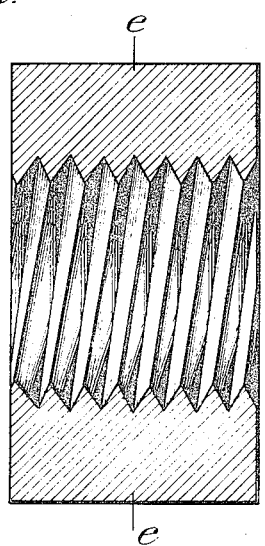

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

METHOD OF FORMING BOLT-NUTS.

1,154,134.

Specification of Letters Patent.

Patented Sept. 21, 1915.

Original application filed November 8, 1913, Serial No. 799,868. Divided and this application filed March 5, 1914. Serial No. 822,592.

*To all whom it may concern:*

Be it known that I, WILLIAM E. SHARP, a citizen of the United States, residing at Chicago, in the county of Cook and State of Illinois, have invented certain new and useful Improvements in Methods of Forming Bolt-Nuts, of which the following is a description.

This application is a division of an application heretofore filed by me on November 8, 1913, Serial Number 799,868.

My invention is particularly adapted to produce what is generally termed "grip nuts," in which the nut is so formed as to engage the bolt in a manner which tends to prevent the accidental disengagement of the nut from the bolt, as by backing off caused by shocks or jarring of the parts.

To this end my invention consists in the novel method of forming the nut more fully described herein, and particularly pointed out in the claims.

In the drawings, wherein like reference characters indicate like or corresponding parts, Figure 1 is a side elevation of a swaging mandrel employed in connection with my invention, and Fig. 2 is a transverse section through a nut, formed with the aid of said mandrel.

The parts are exaggerated as shown in the drawings to more clearly illustrate the invention.

As shown in the drawings, 1 is a swaging mandrel which is suitably hardened to accomplish the purpose for which it is constructed. The advancing end of the mandrel as at *b—b* may, if desired, be formed with a standard thread, with which the regularly threaded nut will readily engage. This is provided for a lead for the following part of the swage until the latter is suitably and firmly engaged with the nut to secure proper swaging action. The said advancing end is preferably of such dimensions as to permit the necessary backing out of the swage without affecting the slightly modified form of the swaged threads.

The following part of the mandrel, as at *c—c*, is gradually modified as to the thread, so as to swage the thread on the nut part way through the same, into a form which may be termed abnormal, meaning a slight modification of either the thread or the helix of the nut. As shown in the drawings, the inclination or pitch of the thread is swaged slightly out of the normal. The nut, after being cut in the usual manner, is threaded upon the mandrel and forced thereon, preferably to the point where about one-half of the nut will be left with the standard thread, while the remaining part is swaged and gradually merges into the abnormal form. This line of modification in the nut may begin at such a point as may be desired. As shown in Fig. 2, it begins about midway between the two faces of the nut, substantially as at *e—e*.

Obviously, it does not matter which face of the nut is entered by the mandrel in forming the nut, and the mandrel may enter from the side on which the tapper tap was first engaged with the nut, or from the opposite side thereof, suitable mechanism being employed to accomplish this purpose. Thus the tapper tap may cut the nut in the usual manner, and as it is withdrawn therefrom, the mechanism may cause the mandrel to enter the nut from the opposite side, engaging with and led by the threads thus cut, and forcing its way into the nut until it has swaged a portion of the threads slightly out of the standard form or pitch.

It will be seen that no further cutting is done, and that the form or pitch, or if preferred, both, may be modified as described. The swaging being gradual, the lead provided by the loosely fitting advancing end of the swage may, in some cases, be practically omitted with good results.

The nut thus formed will bind upon and frictionally engage a suitable bolt, with sufficient grip to prevent accidental disengagement therefrom, and requiring a suitable wrench or tool to disconnect the parts.

Having thus described my invention, what I claim as new and desire to secure by Letters Patent is:

The method of forming a bolt nut, consisting in preparing a swaging mandrel, with a section thereof corresponding to the normal standard thread on the nut, and another section thereof varying therefrom, and forcing a nut on said mandrel to a point where a part of the nut is forced upon said modified part of the mandrel, whereby a section of the threaded portion of the nut is normal, and another section thereof varies therefrom.

In testimony whereof, I have hereunto signed my name in the presence of two subscribing witnesses.

W. E. SHARP.

Witnesses:
W. C. COOK,
CHARLES I. COBB.